United States Patent
Lin et al.

(10) Patent No.: US 9,706,763 B2
(45) Date of Patent: Jul. 18, 2017

(54) FISH ATTRACTING LAMP DEVICE AND A SYSTEM THEREOF

(71) Applicant: Genius Electronic Optical Co., Ltd., Taichung (TW)

(72) Inventors: Chih-Shen Lin, Taichung (TW); Ming-Chi Hung, Taichung (TW); Chien-Fa Wang, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 210 days.

(21) Appl. No.: 14/323,661

(22) Filed: Jul. 3, 2014

(65) Prior Publication Data
US 2015/0272097 A1    Oct. 1, 2015

(30) Foreign Application Priority Data
Mar. 27, 2014    (TW) .............................. 103111396 A

(51) Int. Cl.
| | |
|---|---|
| *A01K 97/02* | (2006.01) |
| *F21V 29/51* | (2015.01) |
| *F16B 7/04* | (2006.01) |
| *A01K 85/01* | (2006.01) |

(52) U.S. Cl.
CPC .............. *A01K 97/02* (2013.01); *A01K 85/01* (2013.01); *F16B 7/04* (2013.01); *F21V 29/51* (2015.01)

(58) Field of Classification Search
CPC ...... B63B 45/02; A01K 75/02; A01K 87/007; A01K 97/02; F21V 29/51; F21V 29/30; F21V 29/006; F16B 7/04; F16B 7/0433
See application file for complete search history.

(56) References Cited

U.S. PATENT DOCUMENTS

2008/0062694 A1*  3/2008  Lai .......................... F21V 29/30
                                                         362/294
2008/0250691 A1* 10/2008  Barnes ................. A01K 87/007
                                                         43/17

* cited by examiner

*Primary Examiner* — Anh Mai
*Assistant Examiner* — Nathaniel Lee
(74) *Attorney, Agent, or Firm* — Wang Law Firm, Inc.

(57) ABSTRACT

A fish attracting lamp device includes a rod with at least one fixing portion; at least one lamp frame with a connecting portion fixed to the fixing portion of the rod; a plurality of light sources fixed in the at least one lamp frame to produce light beams to attract fish and each being provided with a coolant input pipe and a coolant output pipe; and a cooling pipe set connected to the coolant input and output pipes of the light sources. A fish attracting lamp system in accordance with the present invention includes plural such fish attracting lamp devices, each of the fish attracting lamp devices has a pipeline inlet connected to a pipeline inlet of a neighboring fish attracting lamp device, and has a pipeline outlet connected to a pipeline outlet of another neighboring fish attracting lamp device.

9 Claims, 8 Drawing Sheets

FISH ATTRACTING LAMP DEVICE AND A SYSTEM THEREOF

CROSS REFERENCE TO RELATED APPLICATIONS

This application claims the benefit of priority to TW 103111396, filed on Mar. 27, 2014 with the Intellectual Property Office of the Republic of China, Taiwan, which is hereby incorporated in its entirety by reference.

BACKGROUND OF THE INVENTION

Field of the Invention

The present invention relates to a lamp, and more particularly to a fish attracting lamp device for attracting aquatic organisms.

Description of the Prior Art

Organisms with positive phototaxis will be affected by ambient light and move toward the direction of light Source. Fish attracting lamp is such a device used to attract aquatic organisms by taking advantage of phototaxis.

FIG. 1 shows a conventional fish attracting lamp, which comprises a rod 10 having a fixing end 11 fixed to a fishing boat or ship, another end of the rod 10 stands upright on the fishing ship, and a plurality of lamps 12 provided on the rod 10 produce light beams to attract aquatic organisms. To improve the efficiency of attracting fish, the lamps 12 are usually high power lamps.

However, high power lamps always come with high requirement of heat dissipation, because insufficient heat dissipation always reduces the illuminating efficiency and even damages the lamps 12. The heat dissipation of conventional fish attracting lamp is only exposing the lamps 12 directly to ambient air which takes away the heat of the lamps 12 automatically. However, heat dissipation through ambient air is not good enough, which results in a low heat dissipation of the fish attracting lamp.

The present invention has arisen to mitigate and/or obviate the afore-described disadvantages.

SUMMARY OF THE INVENTION

The primary objective of the present invention is to provide a fish attracting lamp device with good heat dissipation performance.

To achieve the above objective, a fish attracting lamp device in accordance with the present invention comprises: a rod with at least one fixing portion; at least one lamp frame with a connecting portion fixed to the fixing portion of the rod; a plurality of light sources fixed in the at least one lamp frame to produce light beams to attract fish and each being provided with a coolant input pipe and a coolant output pipe; and a cooling pipe set connected to the coolant input and output pipes of the light sources.

To achieve the above objective, a fish attracting lamp system in accordance with the present invention comprises: a plurality of the fish attracting lamp devices, each of the fish attracting lamp devices has a pipeline inlet connected to a pipeline inlet of a neighboring fish attracting lamp device, and has a pipeline outlet connected a pipeline outlet of another neighboring fish attracting lamp device.

The fish attracting lamp system in accordance with the present invention offers the following advantages: each of the light sources of the fish attracting lamp is provided with a coolant input pipe and a coolant output pipe. The number and density of the light sources can be adjusted as desired, then a cooling pipe set is connected to the coolant input and output pipes. The coolant contained in the cooling pipe set flows into the coolant input pipe and out of the coolant output pipe, so as to cool off the light sources.

DETAILED DESCRIPTION OF THE PREFERRED EMBODIMENTS

Figure 1:
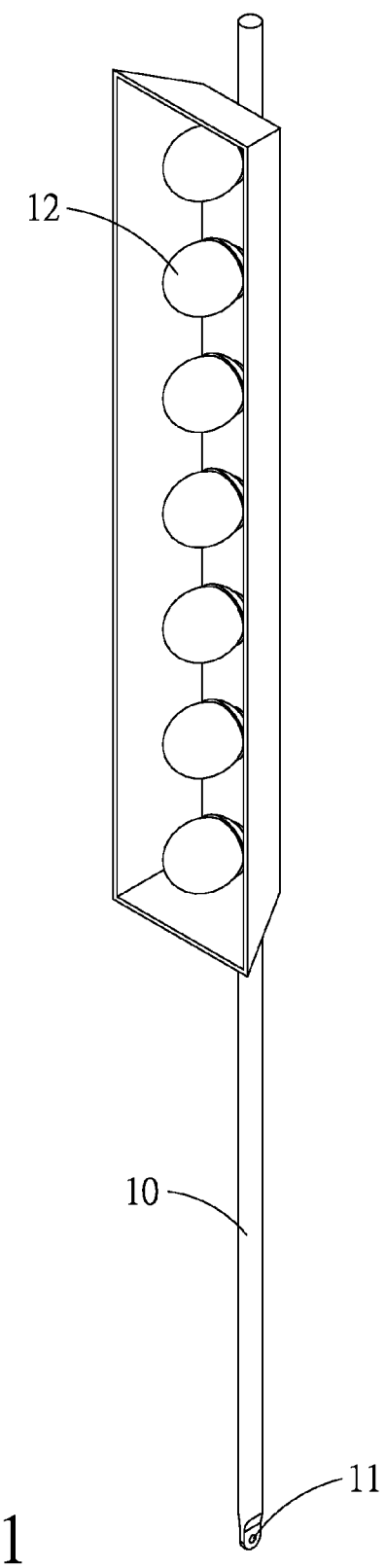
FIG. 1 shows a conventional fish attracting lamp.

The present invention will be clearer from the following description when viewed together with the accompanying drawings, which show, for purpose of illustrations only, the preferred embodiment in accordance with the present invention.

Referring to FIGS. 2-5, a fish attracting lamp device 2 in accordance with a first preferred embodiment of the present invention is mounted on a fishing ship 70, and comprises: a rod 20, at least one lamp frame 30, a plurality of light sources 40 and a cooling pipe set 50.

The rod 20 has one end pivoted to a fixing rod 71 which stands upright on the fishing ship 70. Another end of the rod 20 protrudes out of the fishing ship 70 is provided with at least one fixing portion 21. In this embodiment, the fixing portion 21 is formed by two opposite parallel flat surfaces which are located at two sides of the outer surface of the rod 20 and formed by applying pressing force to the rod 20. Between the fixing portion 21 and the end of the rod 20 pivoted to the fixing rod 71 is provided an adjustment rod 22 which is pivoted to the rod 20 and formed with a plurality of positioning portions 221, and the adjustment rod 22 is fixed to the fixing rod 71 through one of the positioning portions 221. It is to be noted that the fixing rod 71 is fixed to the shipboard and is not a part of the fish attracting lamp device. The fixing rod 71 is not limited to the abovementioned structure, and the position of the adjustment rod 22 with respect to the rod 20 is also not limited to the above description.

The lamp frame 30 is fixed to the fixing portion 21 of the rod 20 via a connecting portion 32, and includes a base 31. The connecting portion 32 is formed on the base 31 and includes two clamping pieces 321 perpendicular to the base 31. The lamp frame 30 is clamped to the flat fixing portion 21 of the rod 20 by the clamping pieces 321 and then fixed thereto by a fastener 33, so that the rod 20 can't rotate with respect to the lamp frame 30. In this embodiment, the fastener 33 is a U-shaped clamp to abut against the rod 20 and has two free ends 331 inserted through the lamp frame 30 and fixed thereon by a plurality of nuts 332. The lamp frame 30 is formed with a plurality of hollow portions 34. At both sides of the connecting portion 32 is formed an auxiliary positioning piece 35, and between each of the auxiliary positioning pieces 35 and the connecting portion 32 is defined a gap 36.

The light sources 40 are fixed in the hollow portions 34 of the base 31 of the lamp frame 30 and produce light beams to attract fish. Each of the light sources 40 is provided with a coolant input pipe 41 and a coolant output pipe 42. In this embodiment, the coolant input and output pipes 41, 42 are held in the gaps 36, and the auxiliary positioning pieces 35 and the gaps 36 are used to fix the position of the coolant input and output pipes 41, 42. The auxiliary positioning pieces 35 and the gaps 36 are not limited to the above embodiment. The lamp frame 30 can also be provided with no hollow portions 34, auxiliary positioning pieces 35 and gaps 36, and the light sources 40 can be directly attached to an opposite side of the connecting portion 32.

The cooling pipe set 50 is connected to the coolant input and output pipes 41, 42.

Figure 2:
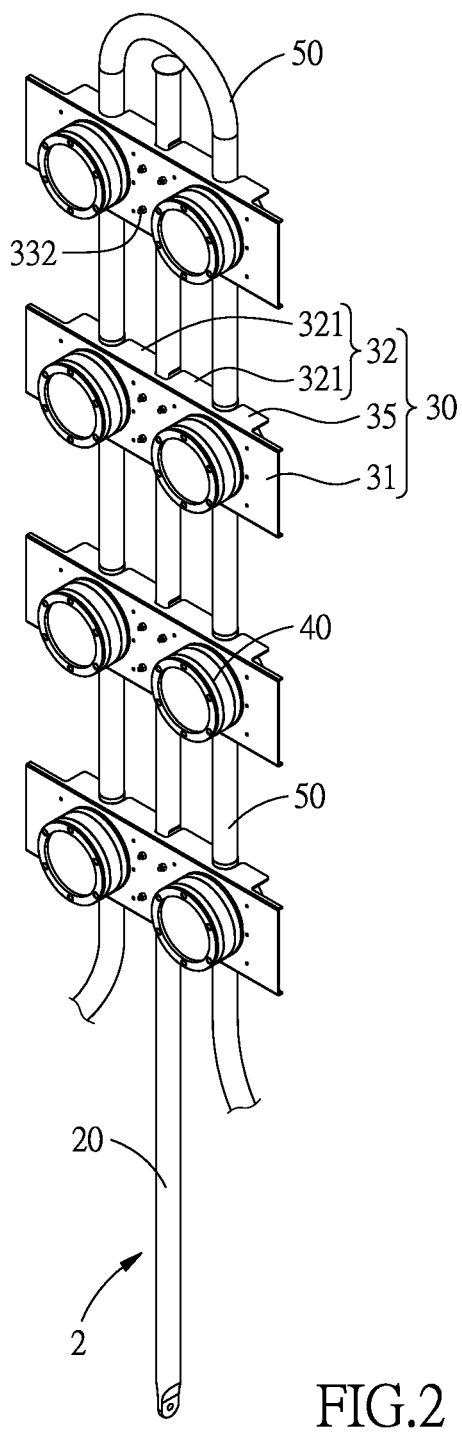
FIG. 2 is a perspective view of a fish attracting lamp device in accordance with a first preferred embodiment of the present invention.
Figure 3:
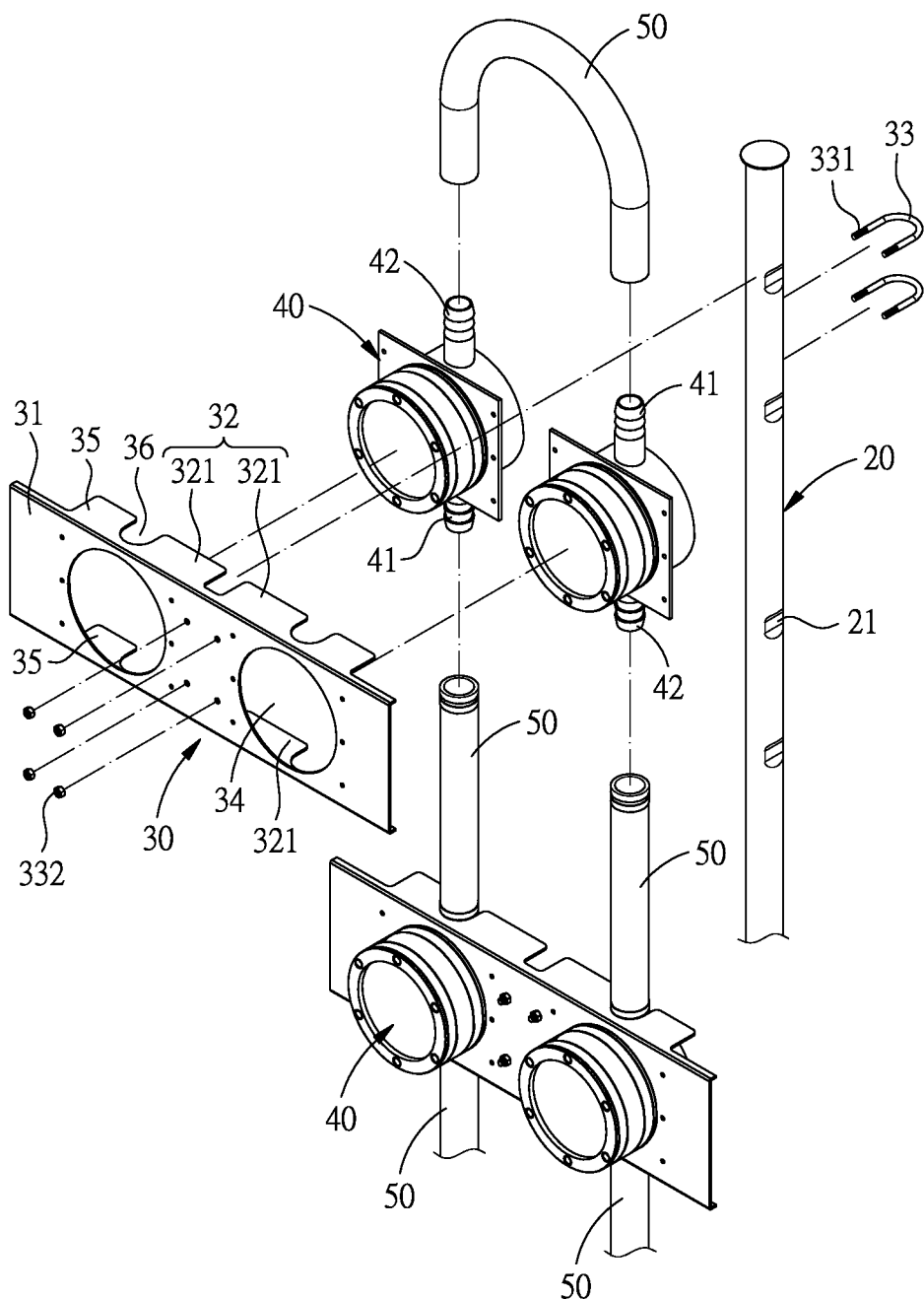
FIG. 3 is an exploded view of a part of FIG. 2.
Figure 4:
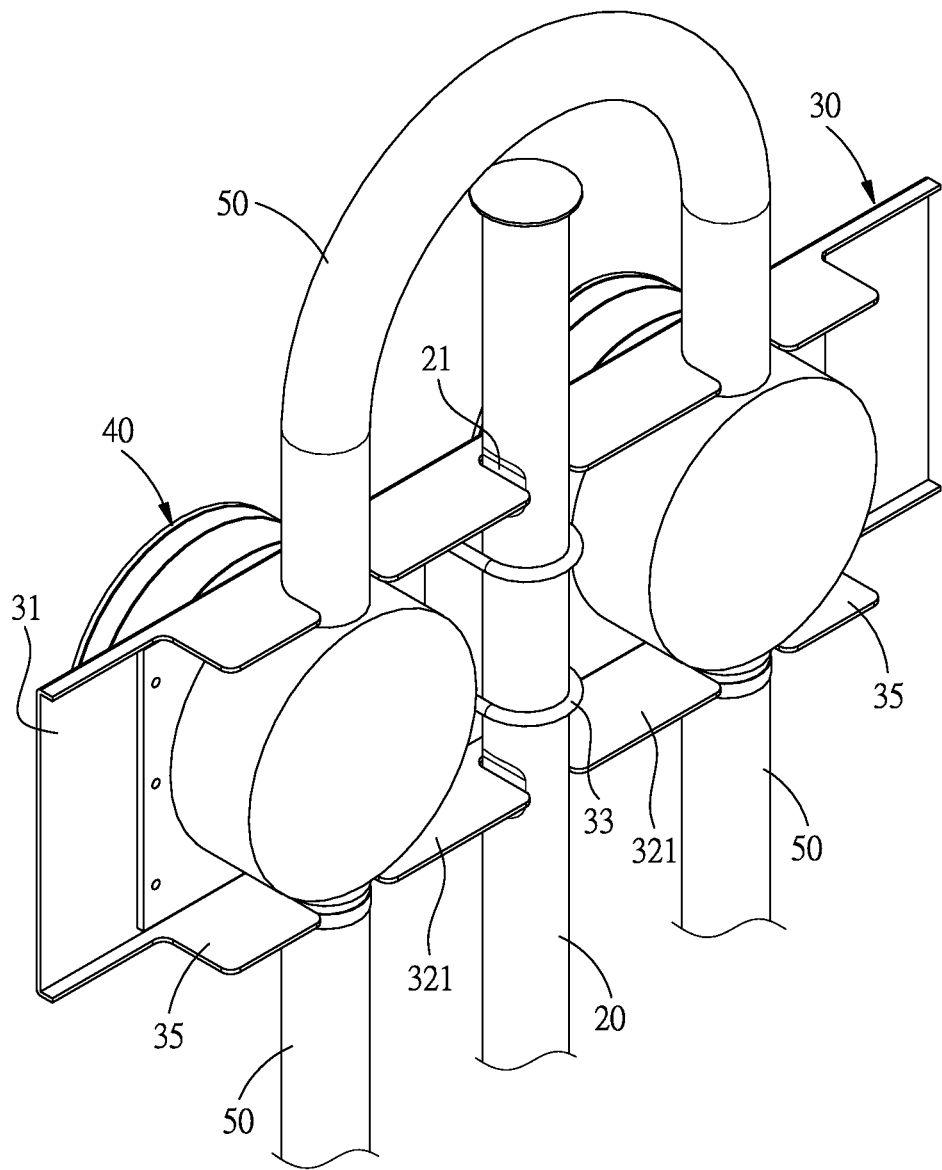
FIG. 4 is a magnified view of a part of the fish attracting lamp device in accordance with the first preferred embodiment of the present invention.
Figure 5:
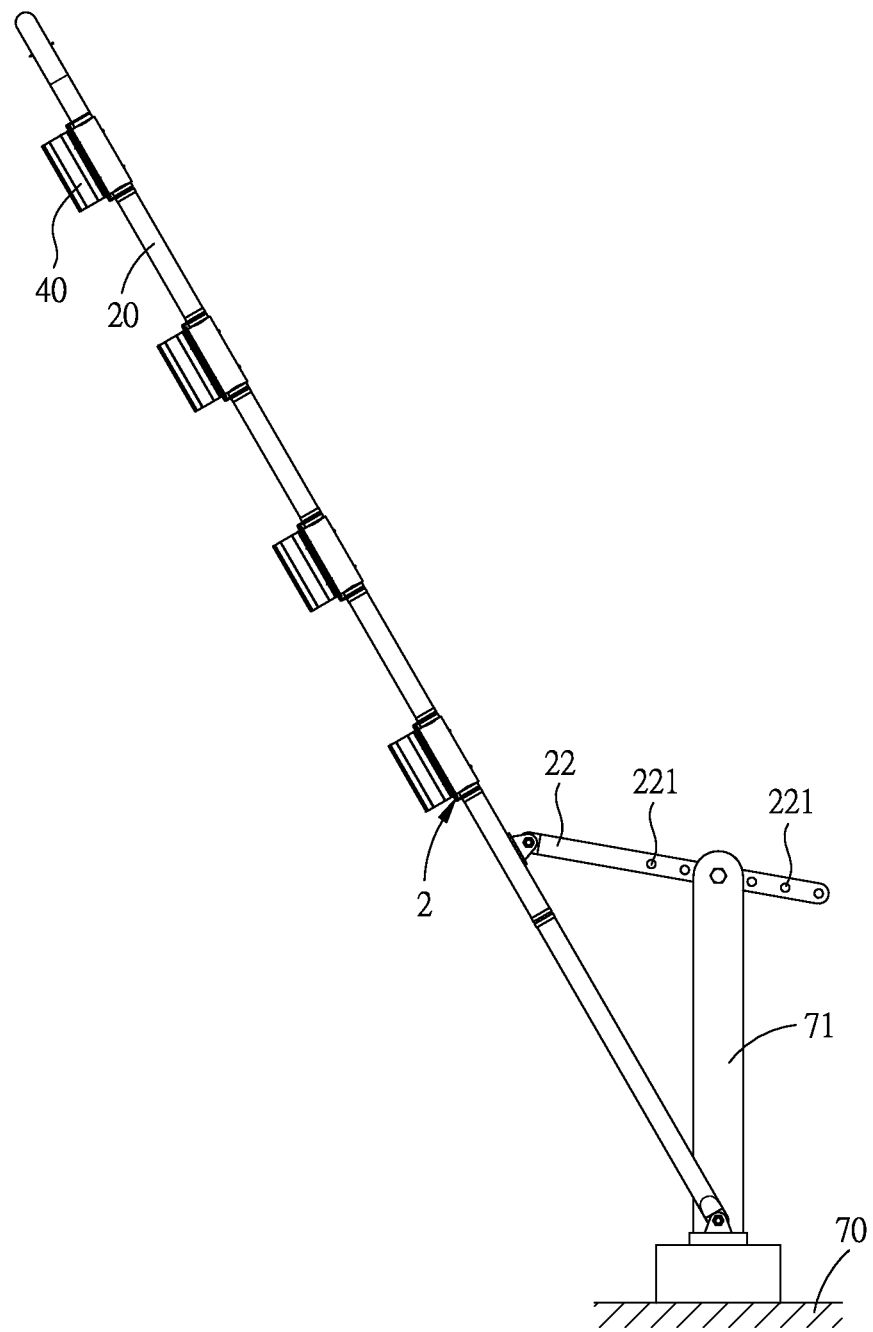
FIG. 5 is a side view showing that the fish attracting lamp device in accordance with the first preferred embodiment of the present invention is mounted on a shipboard.

What mentioned above are the structures of the first preferred embodiment of the present invention, for a better understanding of a fish attracting lamp device of the invention, its operating advantages and the specific objects attained by its uses, reference should be had to FIGS. 2-4. To assemble the fish attracting lamp device of the present invention, the light sources 40 should be mounted on a lamp frame 30, then the cooling pipe set 50 is connected to the coolant input and output pipes 41, 42. Then, another lamp frame 30 which has been equipped with the light sources 40 is connected to the previous lamp frame 30 and has the coolant input and output pipes 41, 42 coupled to the previous cooling pipe set 50, and the number of the lamp frames 30 can be adjusted as desired. After that, the lamp frames 30 are fixed to the rod 20 by the fastener 33. Then, the rod 20 is fixed to the shipboard of the fishing ship 70, and thus the assembly of the fish attracting lamp device 2 is completed. The coolant contained in the cooling pipe set 50 flows into the coolant input pipe 41 and out of the coolant output pipe 42, so as to cool off the light sources 40.

It should be noted that, as shown in FIGS. 5 and 2-4, between the fixing portion 21 and the end of the rod 20 pivoted to the fixing rod 71 is provided the adjustment rod 22 which is pivoted to the rod 20 and formed with the plural positioning portions 221, and the adjustment rod 22 is fixed to the fixing rod 71 through one of the positioning portions 221. Such an arrangement allows for easy adjustment of the angle of the light sources 40 on the fish attracting lamp device 2.

Since fishing boats imposes a strict requirement on the illumination angle of the light sources 40 of the fish attracting lamp device 2, the connecting portion 32 is designed to be formed on the base 31 and includes the two clamping pieces 321 perpendicular to the base 31. The lamp frame 30 is clamped to the flat fixing portion 21 of the rod 20 by the clamping pieces 321 and then fixed thereto by a fastener 33, so that the rod 20 can't rotate with respect to the lamp frame 30, namely, the illumination angle of the light sources 40 is ensured. It should be noted that the above embodiments are illustrative and not intended to limit the scope of the present invention.

Figure 6:
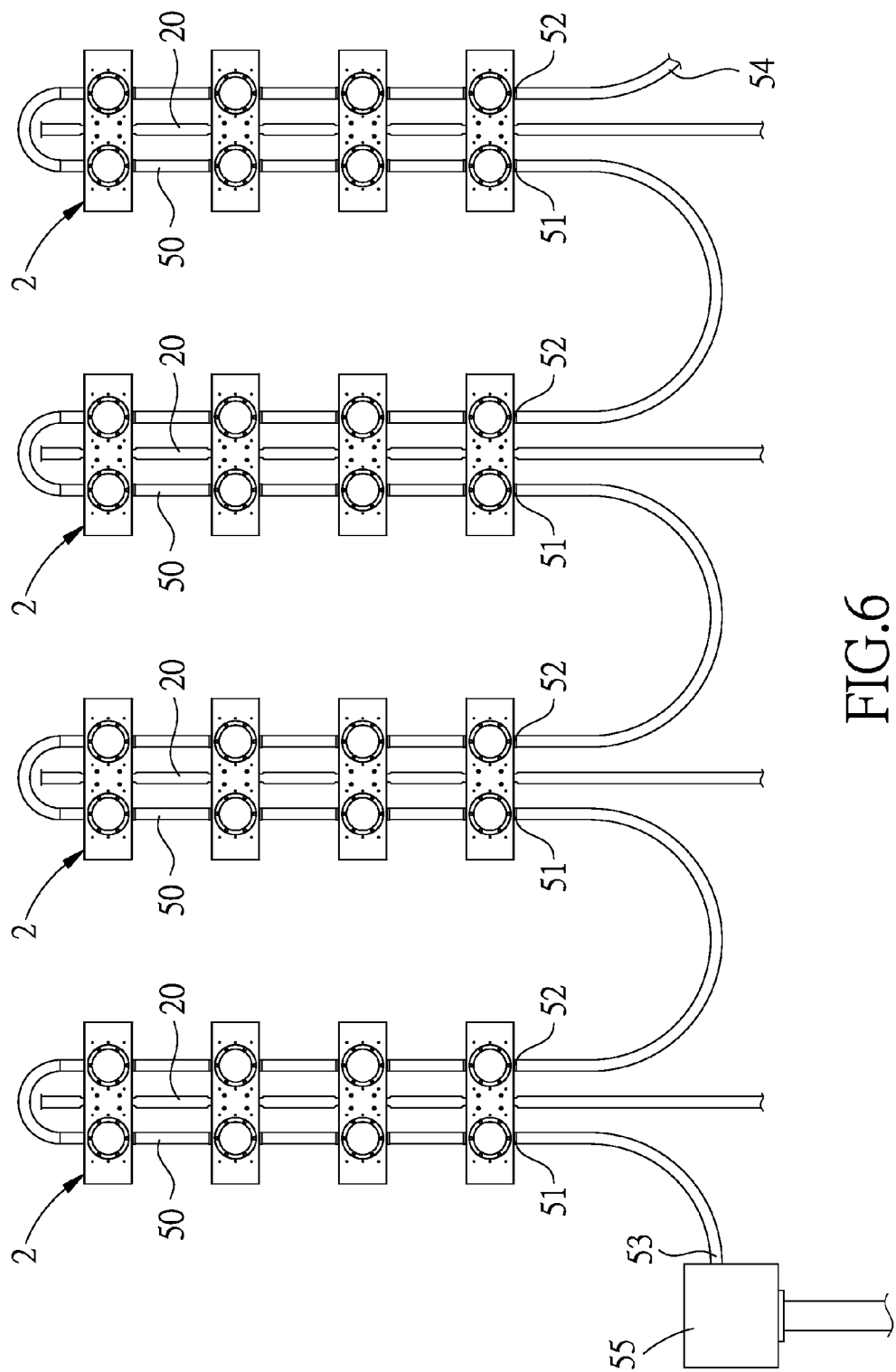
FIG. 6 shows a fish attracting lamp system formed by a plurality of the fish attracting lamp devices in accordance with the present invention.

A plurality of fish attracting lamp devices 2 can be mounted on the fishing ship 70 to form a fish attracting lamp system, as shown in FIG. 6. Each of the fish attracting lamp devices 2 has a pipeline inlet 51 and a pipeline outlet 52 which are connected to a pipeline inlet 51 of a neighboring fish attracting lamp device 2 and a pipeline outlet 52 of another neighboring fish attracting lamp device 2, respectively. The fish attracting lamp system includes a master pipeline inlet 53 and a master pipeline outlet 54, and the master pipeline inlet 53 is connected to a pump 55. In this embodiment, seawater is drawn by the pump 55 as a coolant liquid, and the coolant liquid is finally discharged into the sea via the master pipeline outlet 54 after flowing through the light sources.

To the prevent algae growth inside the cooling pipe set 50 and affecting the flow of the coolant liquid, the outer surface of the cooling pipe set 50 can be designed in black to reduce sunshine, so as to prevent the algae growth by reducing the amount of sunshine inside the cooling pipes.

Figure 7:
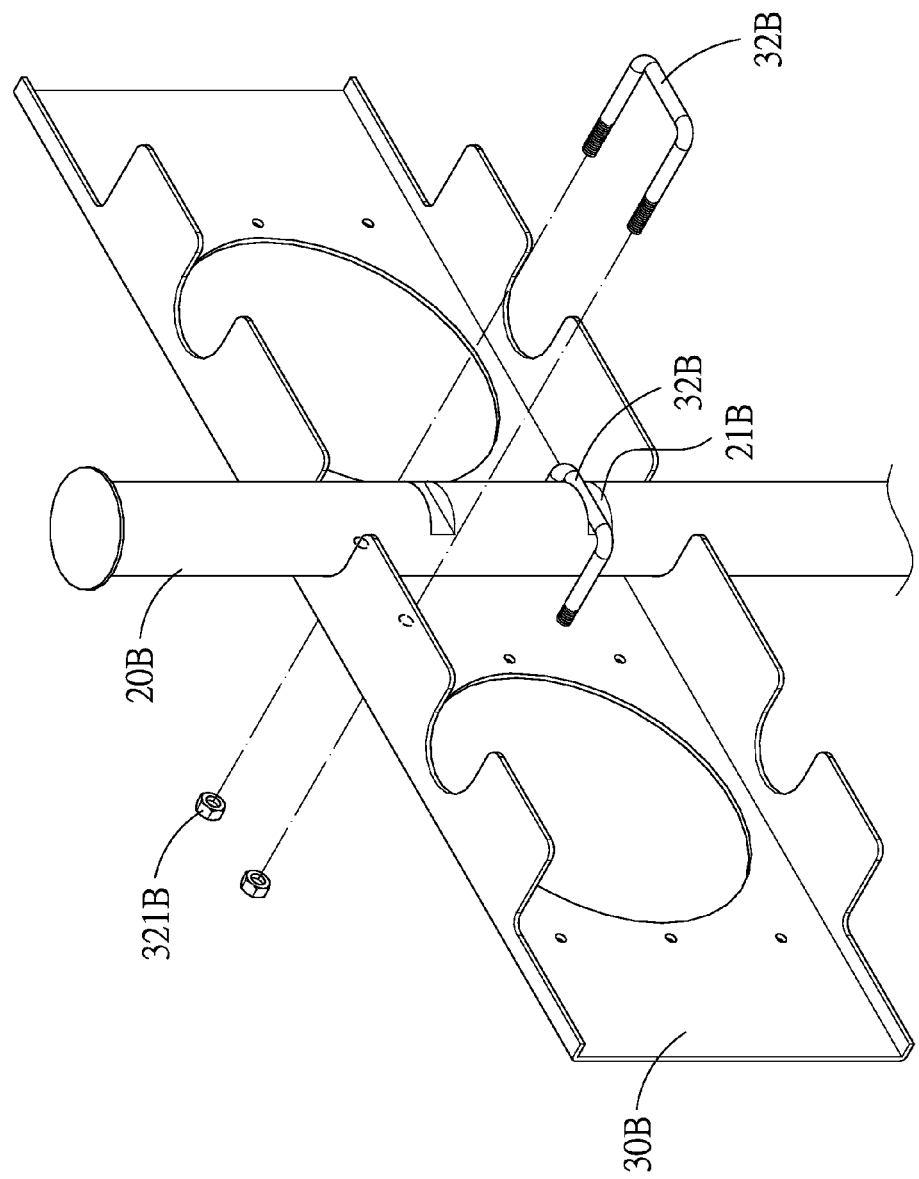
FIG. 7 shows another embodiment of the connecting portion and the fixing portion of the present invention.

Referring then to FIG. 7, another embodiment of the connecting portion and the fixing portion of the present invention is shown, wherein the fixing portion 21B of the rod 20B is a groove, and the connecting portion 32B is a U-shaped fastener which presses against the fixing portion 21B and has two free ends fixed to the lamp frame 30B by nuts 321B. The fixing portion can also be two threaded holes formed on the rod 20B, and the lamp frame can be provided with two opposite walls which are located corresponding to the two threaded holes and perpendicular to the lamp frame, then a screw is inserted through the two walls and the threaded holes and screwed with a nut, and this is another embodiment of the fixing portion and the connecting portion.

Figure 8:
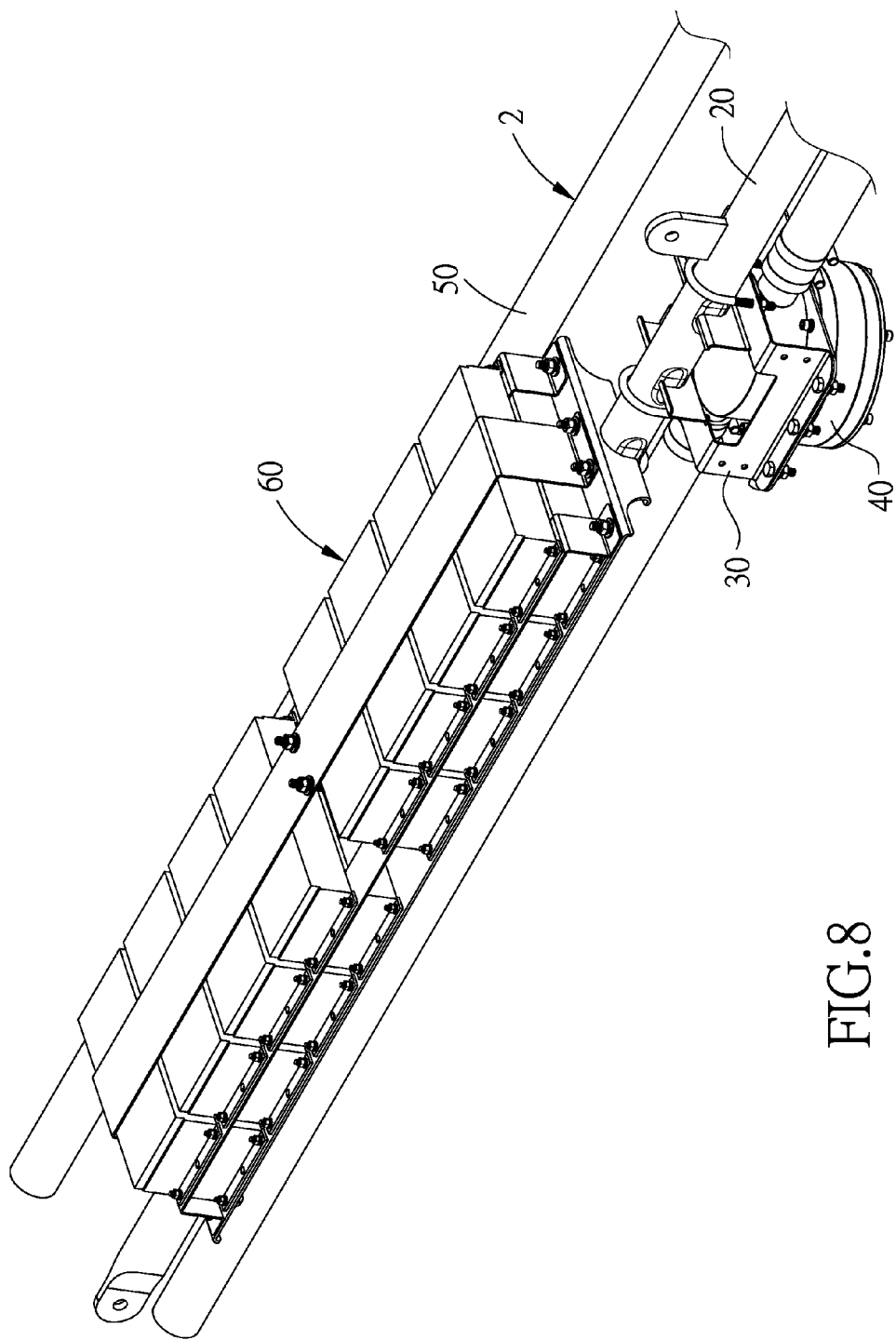
FIG. 8 is an operational view of the fish attracting lamp device in accordance with the present invention.

Referring then to FIG. 8, the fish attracting lamp device 2 of the present invention can also be provided with a power supply 60 which is fixed to the rod 20 and located adjacent to the fixing rod (not shown). In addition to reducing the center of gravity of the rod 20, the power supply 60 can supply power directly to the fish attracting lamp device 2, reducing wire clutter.

While we have shown and described various embodiments in accordance with the present invention, it is clear to those skilled in the art that further embodiments may be made without departing from the scope of the present invention.

What is claimed is:

1. A fish attracting lamp device comprising:
   a rod with at least one fixing portion;
   at least one lamp frame with a connecting portion fixed to the fixing portion of the rod;
   a plurality of light sources fixed in the at least one lamp frame to produce light beams to attract fish and each being provided with a coolant input pipe and a coolant output pipe; and
   a cooling pipe set connected to the coolant input and output pipes of the light sources;
   wherein the lamp frame includes a base, the connecting portion is formed on the base and includes two clamping pieces perpendicular to the base, the fixing portion is formed by two opposite parallel flat surfaces which are located at two sides of an outer surface the rod, the light sources are fixed on the base, and the lamp frame is clamped to the flat fixing portion of the rod by the clamping pieces.

2. The fish attracting lamp device as claimed in claim 1 further comprising a fastener which is abutted against the rod and has two ends to fix the lamp frame.

3. The fish attracting lamp device as claimed in claim 1, wherein the fixing portion is a groove, and the connecting portion is a U-shaped fastener which is abutted against the rod and has two ends to fix the lamp frame.

4. The fish attracting lamp device as claimed in claim 1, wherein the rod is connected to an adjustment rod which is fixed to a fixing rod, and the fixing rod is fixed to a shipboard.

5. The fish attracting lamp device as claimed in claim 4, wherein the adjustment rod is pivoted to the rod which is pivoted to the fixing rod, and the adjustment rod is formed with a plurality of positioning portions and fixed to the fixing rod through one of the positioning portions.

6. The fish attracting lamp device as claimed in claim 1 further comprises a power supply which is fixed to the rod.

7. A fish attracting lamp system comprising a plurality of the fish attracting lamp devices as claimed in claim 1, wherein each of the fish attracting lamp devices has a pipeline inlet connected to a pipeline inlet of a neighboring fish attracting lamp device, and has a pipeline outlet connected to a pipeline outlet of another neighboring fish attracting lamp device.

8. The fish attracting lamp system as claimed in claim 7 further comprising a master pipeline inlet and a master pipeline outlet, and the master pipeline inlet is connected to a pump.

9. The fish attracting lamp system as claimed in claim 8, wherein cooling pipes of the fish attracting lamp system are filled with seawater, and each have a black outer surface.

* * * * *